(12) United States Patent
Gupta et al.

(10) Patent No.: US 6,590,895 B1
(45) Date of Patent: Jul. 8, 2003

(54) ADAPTIVE RETRANSMISSION FOR ERROR CONTROL IN COMPUTER NETWORKS

(75) Inventors: Amit Gupta, Fremont, CA (US); Radia J. Perlman, Acton, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/173,228

(22) Filed: Oct. 15, 1998

(51) Int. Cl.⁷ .............................................. H04L 12/56
(52) U.S. Cl. ........................................ 370/394; 714/748
(58) Field of Search .................................. 370/389, 392, 370/394, 428, 465; 709/230, 232; 714/748

(56) References Cited

U.S. PATENT DOCUMENTS

| | | | |
|---|---|---|---|
| 4,726,027 A | * 2/1988 | Nakamura et al. | 714/748 |
| 4,841,526 A | * 6/1989 | Wilson et al. | 714/748 |
| 5,168,497 A | * 12/1992 | Ozaki et al. | 370/394 |
| 5,550,847 A | * 8/1996 | Zhu | 714/748 |
| 5,636,230 A | * 6/1997 | Marturano et al. | 714/718 |
| 5,699,367 A | 12/1997 | Haartsen | 371/33 |
| 5,815,508 A | * 9/1998 | Wadzinske et al. | 714/718 |
| 6,021,124 A | * 2/2000 | Haartsen | 370/428 |

OTHER PUBLICATIONS

Error Control Techniques for Integrated Services Packet Networks, Michael J. Miller, *IEEE* 1989.

An Efficient Store–and–Forward Protocol for a Shallow-Water Acoustic Local Area Network, Jennifer L. Talavage, Timothy E. Thiel, David Brady, Department of Electrical and Computer Engineering, Northeastern University, Boston, MA 02115, *IEEE*, 1994.

On Large–Scale Reliable Multicast Protocols, M. Schuba, P. Rechl, Aachen University of Technology, Germany, Apr. 1, 1998, Conference Publication No. 451, *IEE* 1998.

* cited by examiner

*Primary Examiner*—Chau Nguyen
*Assistant Examiner*—Soon Dong Hyun
(74) *Attorney, Agent, or Firm*—Weingarten, Schurgin, Gagnebin & Lebovici, LLP

(57) ABSTRACT

Protocols that provide more efficient operation in dynamic and heterogeneous networking environments are defined. The protocols present a range of levels of error control and sequence order control. Traffic in a link between neighboring network devices is segregated into flows. Each flow is managed in accordance with a selected protocol. It is possible to simultaneously employ different protocols for respective flows within the link.

3 Claims, 3 Drawing Sheets

ADAPTIVE RETRANSMISSION FOR ERROR CONTROL IN COMPUTER NETWORKS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to communication protocols in computer networks, and particularly to reliability protocols for error control in dynamic and heterogeneous computer networks.

Communications protocols for transmitting a sequence of data units from a first application to a second application via a source device, intermediate network routing devices, and a destination device in a computer network are known. "Reliable" protocols provide for detection and retransmission of data units that are lost in transit. In an "end-to-end" reliable protocol the destination device is responsible for detecting the loss of data units. The order of transmission of the data units is maintained by delaying transmission of data units that are received after the loss of a data unit is detected by the destination device. In particular, the data units are buffered at the destination device until the lost data unit is received by the destination device. The source device retransmits the lost data unit to the destination device after being notified of the loss via a repair request message. In a "hop-by-hop" reliable protocol the destination device and intermediate network devices are responsible for detecting the loss of data units. As in the end-to-end protocol, the order of transmission of the data units is maintained by delaying transmission of data units that are received after the loss is detected. In particular, the data units are buffered at the device that recognized the loss. The lost data unit may be retransmitted by either the source device or an intermediate repair head device. In a "datagram" protocol, which is not a reliable protocol, lost data units are not retransmitted and the order of transmission of the data units is not necessarily maintained. Each of these known protocols performs well under some circumstances and poorly under other circumstances.

One limitation associated with the sequenced reliable protocol is that data forwarding is held up until the lost packet is successfully received. This can significantly reduce the useful data rate of the flow and increase unnecessary transmissions, particularly in environments with large bandwidth-product delays. This is counterproductive for applications that benefit from reliability but can tolerate out-of-sequence delivery.

One limitation associated with the datagram protocol is that loss of data units is not detected and repaired. Some applications are intolerant to data unit loss. Further, the order of transmission of the data units is not necessarily maintained. Some applications are sensitive to the order in which data units are delivered. Also, the application may need, or benefit from, limited reliability which is still better than the current Internet best-effort service.

BRIEF SUMMARY OF THE INVENTION

In accordance with the present invention, new reliability management protocols are employed to provide more efficient operation in dynamic and heterogeneous networking environments. These protocols present a range of levels of error control and sequence order control.

The new protocols include a reliable protocol, a semireliable protocol and an acknowledgement-based semireliable protocol. In the reliable protocol the order of transmission of the data units is not necessarily maintained and lost data units are identified and retransmitted. In the semireliable protocol the order of transmission of the data units is not necessarily maintained and limited action is taken to identify and recover lost data units. In the acknowledgement based semi-reliable protocol the receiver device in a link acknowledges receipt of each data unit by sending an acknowledgement message to the transmitter device, and the transmitter device is responsible for detecting the loss of data units.

BRIEF DESCRIPTION OF THE SEVERAL VIEWS OF THE DRAWING

The foregoing features of this invention, as well as the invention itself, may be more fully understood from the following Detailed Description of the Invention, and Drawing, of which.

DETAILED DESCRIPTION OF THE INVENTION

Figure 1:
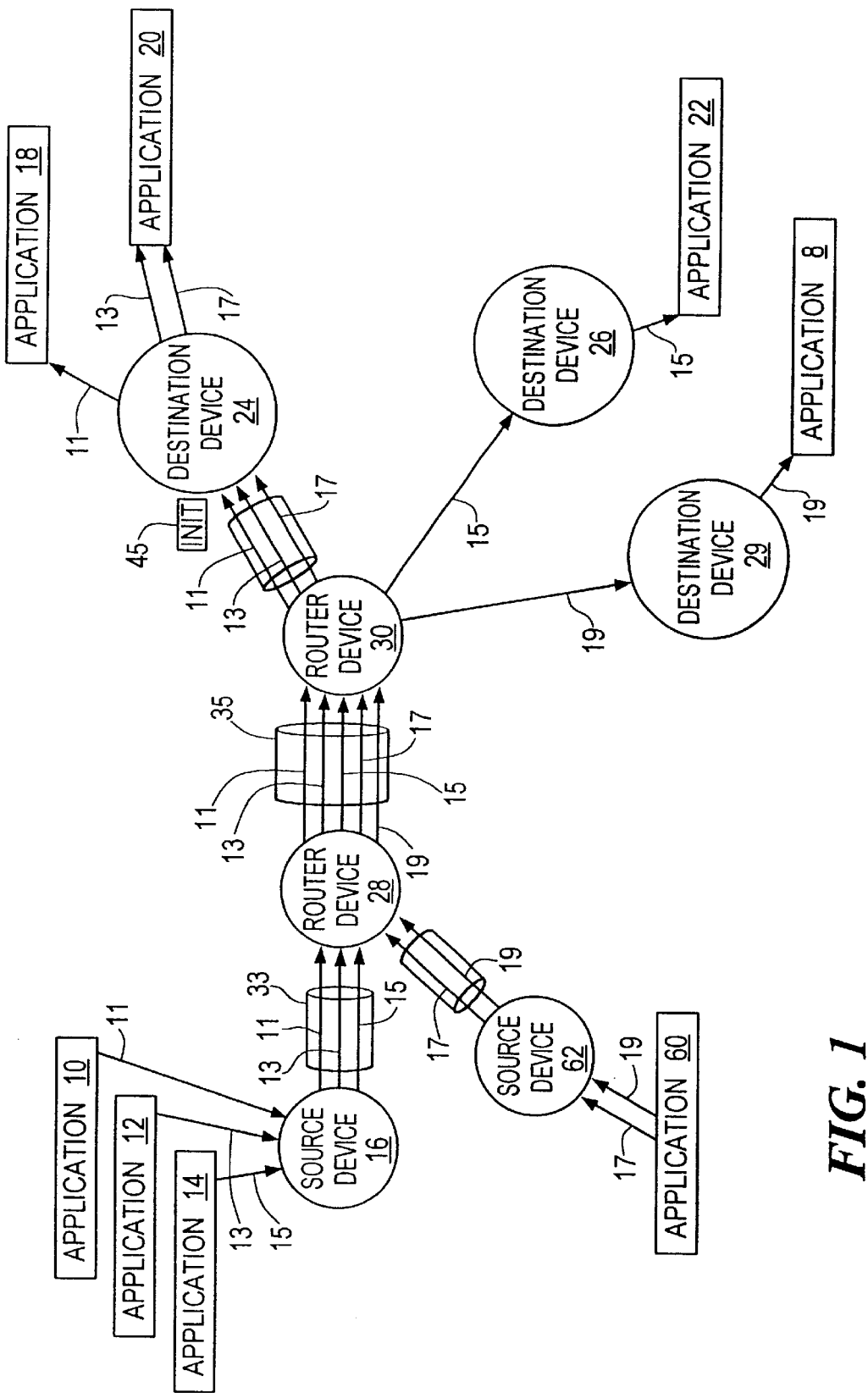
FIG. 1 is a block diagram of a portion of a computer network that is consistent with the present invention.

Referring to FIG. 1, sequences of data units associated with source applications 10, 12, 14, are transmitted via a source device 16 to destination applications 18, 20, 22 associated with destination devices 24, 26 in a communications network that includes a plurality of intermediate network devices. In the illustrated embodiment the intermediate network devices include router devices 28, 30, but any number of intermediate network devices may be employed. Similarly, sequences of data units associated with source application 60 are transmitted via source device 62 toward destination application 20 and destination application 8. Each sequence of data units is referred to as a "logical flow." In particular, data units in a first logical flow 11 are transmitted from application 10, to source device 16, to router device 28, to router device 30, to destination device 24, and to application 18. Data units in a second logical flow 13 are transmitted from application 12, to source device 16, to router device 28, to router device 30, to destination device 24, and to application 20. Data units in a third logical flow 15 are transmitted from application 14, to source device 16, to router device 28, to router device 30, to destination device 26, and to application 22. Data units in a fourth logical flow 17 are transmitted from application 60, to source device 62, to router device 28, to router device 30, to destination device 24, to application 20. Data units in a fifth logical flow 19 are transmitted from application 60, to source device 62, to router device 27, to destination device 29, to application 8.

Figure 2:
FIG. 2 is a diagram of a mini-header that is consistent with the present invention.

Referring to FIGS. 1 and 2, the data units associated with each logical flow are distinguishable from data units that are associated with other logical flows. In particular, the data units in each logical flow include a flow designator that is written into at least one field in the header of the data units. Communication "links," can be either physical or logical and include a plurality of flows. Each flow designator is unique within the link in which it is employed. For example, the data units associated with flow 11 contain a designator that is unique within physical link 33. The flow designators may include or be based upon a combination of header information such as the Source Address, Destination Address, Source Port, and Destination Port that is unique within the physical link. In the illustrated embodiment, the flow designator comprises a mini-header 40 that is written into each data unit. In particular, the source device, router device or source application inserts a mini-header with a flow identifier 42 into each data unit that is associated with the logical flow. The mini-header may also include a sequence number 44 and a reliability protocol indicator 46. The flow identifier indicates the flow with which the data unit is affiliated. The sequence number 44 delineates the data unit in the sequence. The reliability protocol indicator 46 indicates which reliability protocol to employ.

The sequence numbers may be employed to facilitate identification of individual data units in a flow. The data units in each flow include consecutive sequence numbers that are written into a field in the header of the data units. The sequence number is incremented (or decremented) in each successive data unit in the flow and may eventually be rolled-over. The sequence number space for each flow can be a finite set of sequence numbers that do not overlap with the sequence numbers that are employed by other flows. Alternatively, the sequence number space can be a finite set of sequence numbers that do overlap with the sequence numbers that are employed by other flows, i.e., "shared" sequence number space. In the illustrated embodiment, a 1 byte sequence number space is shared such that flows may simultaneously use the same sequence numbers. For Example, the sequence numbers can be employed to distinguish between logical flow 11 and logical flow 13 so that logical flow 11 is not interrupted when the transmission of data units that are associated with logical flow 13 is interrupted because of a lost data unit.

The flow designators can be employed to apply different reliability management protocols to different flows on a hop-by-hop, end-to-end and per flow basis. The reliability management protocols may function to, inter alia, limit requests for retransmission. In the illustrated embodiment, the reliability protocol indicator 46 of the mini-header 40 indicates which protocol to employ. The reliability protocol indicator specifies, at least in part, whether the order of transmission of the data units is to be maintained and whether an attempt is to be made to identify and recover lost data units. Specific procedures for recovering lost data units may also be indicated. Multiple protocols can be simultaneously employed on a single link by utilizing different sets of sequence numbers 44 in the header 40 for each flow. Sequence numbers are significant on a per-hop basis (i.e., in the communication between adjacently connected network devices); there need not exist any relationship between sequence numbers on different hops. Further, multiple protocols can be employed for different hops associated with a single logical flow. The new reliability management protocols consistent with the illustrated embodiment include a reliable protocol, a semi-reliable protocol, and an acknowledgement-based semi-reliable protocol.

Logical flows can be initialized by employing various techniques that are known in the art. In one embodiment the source application transmits an initializing data unit 45 via the network to designate each new flow. The initializing data unit indicates a flow identifier, a reliability protocol indicator and a bitmask that indicates a source address, a destination address and port numbers. The initializing data unit also indicates how to recognize data units that are associated with the flow. In this alternative, downstream network devices require knowledge of the criteria employed by the transmitting network device to identify a new flow. If a protocol such as Transmission Control Protocol-Internet Protocol ("TCP-IP"), IPx, Asynchronous Transfer Mode ("ATM") or other suitable protocol is employed, the mini-header need only include the sequence number once the flow is established because the header information and sequence number can be employed to identify the flow. The initializing data unit 45 could alternatively be transmitted by the destination application rather than the source application. If neither a mini-header nor a special initializing data unit are employed, each network device individually designates flows from information in the header of the data units. For example, the Source Address, Destination Address, Source Port, and Destination Port may be employed individually or in combination to identify individual flows at each network device.

Figure 3:
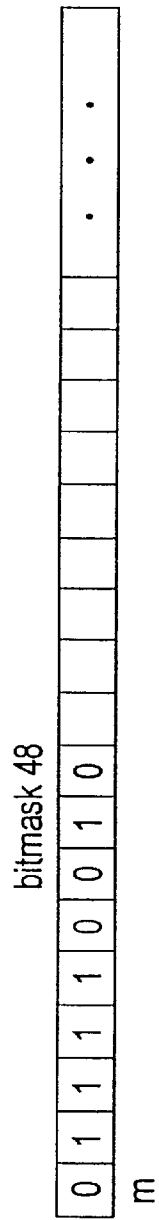
FIG. 3 is a diagram of a repair bitmask that is consistent with the present invention.

Referring to FIGS. 1 and 3, in the reliable protocol the order of transmission of the data units is not necessarily maintained and lost data units are identified and retransmitted. When a data unit [Y] is identified by router device 28 as being lost, data units in the same flow as data unit [Y] that are received by router device 28 after [Y] are forwarded to router device 30. At least one repair request message is transmitted upstream from router device 28 to source device 16 to prompt retransmission of the lost data unit.

In the illustrated embodiment, a bitmask 48 which may have a fixed length such as 32 or 64 bits is employed in accordance with the reliable protocol to track the arrival of data units following lost data unit [Y]. In particular, the bitmask is employed to store an indication of which data units in the sequence are received and which data units are not received, e.g., starting with data unit [Y]. Retransmission is requested for each lost data unit as indicated by the bitmask. In the illustrated example, the source device 16 retransmits the lost data units to router device 28, which retransmits the data units to router device 30 as they are received. As transmission proceeds, the bitmask represents the success and failure of the transmission of individual data units in a sliding window, FIFO or similar implementation. The sliding window may be configured such that each data unit is represented only once in a bitmask (by sliding the bitmask by the full length of the bitmask) or such that data units may be represented in a plurality of bitmasks (by sliding the bitmask by less than the full length of the bitmask). For example, a first 32 bit bitmask could represent data units 0–31 and a second 32 bit bitmask could represent data units 32–63. Once the bitmask in which the lost data unit is represented slides beyond the lost data unit, router device 28 makes no further attempts to obtain the lost data unit. Alternatively, flow control could be implemented in which transmission of further data units is halted or delayed until data unit [Y] is received by router device 28.

In the semi-reliable protocol the order of transmission of the data units is not necessarily maintained and limited action is taken to recover lost data units. When a data unit [Z] is identified by router device 28 as being lost, data units in the same flow as data unit [Z] that are received by router device 28 after [Z] are forwarded to router device 30.

Retransmission of data unit [Z] is requested by router device 28. Data unit [Z] is retransmitted by the source device 16 in response to the retransmission request. A bitmask 48 is employed to track the arrival of data units following data unit [Z] at router device 28. In particular, the bitmask indicates which data units in the flow are received and which data units are not received starting with data unit [Z]. However, the number of retransmission requests that may be generated by router device 28 for data unit [Z] is limited to a predetermined maximum number such as three, five or any other suitable number. Once the predetermined maximum number of retransmission requests are generated for a data unit, no further requests are generated for that data unit.

In the acknowledgement based semi-reliable protocol the receiver device in a link acknowledges receipt of each data unit by transmitting an acknowledgement message to the transmitter device. The transmitting device is responsible for detecting the loss of a data unit. In the illustrated example, router device 28 acknowledges receipt of each data unit to source device 16. Router device 28 functions to forward all data units as they are received. Router device 28 does not track which data units it has not received. The source device 16 identifies lost packets by tracking the acknowledgement messages. If a data unit is identified by the source device 16 as being lost, the source device retransmits the data unit to the router device 28.

Figure 4:
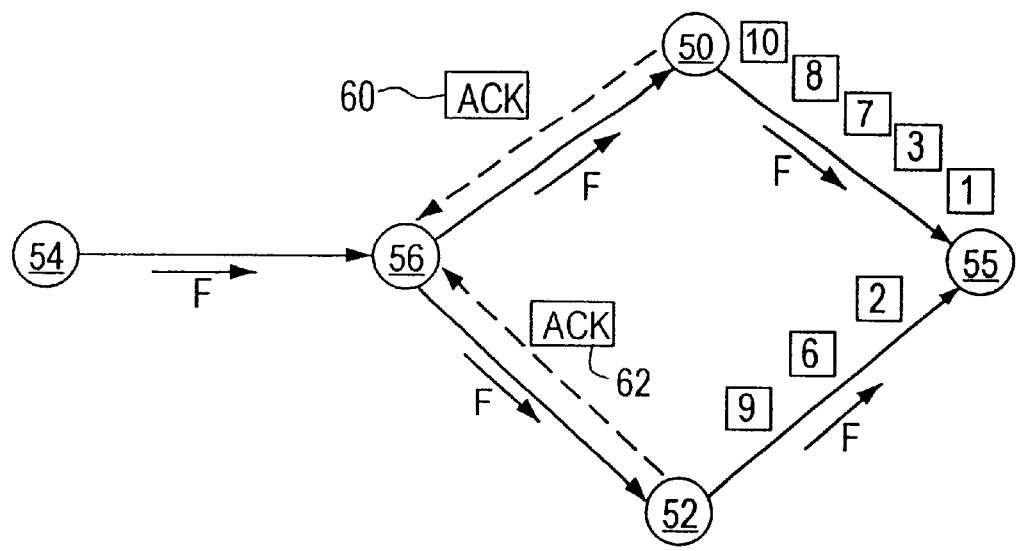
FIG. 4 is a block diagram that illustrates operation of the acknowledgement-based protocol, consistent with the present invention, in a network portion with a split path.

As illustrated in FIG. 4, the acknowledgement-based semi-reliable protocol is tolerant to path splitting in the network. In the illustrated example, a flow F between a router device 54 and a router device 55 is split following router device 56. A first path from device 56 to device 55 traverses a device 50 and a second path from device 56 to device 55 traverses device 52. If router device 50 transmits a receipt acknowledgement 60 for data units 1, 3, 7, 8 and 10 to device 56 and router device 52 transmits a receipt acknowledgement for data units 2, 6, 9 to device 56, then device 56 determines that data units 4 and 5 are indicated to be lost. It should be noted that the acknowledgement messages could alternatively be received by router device 54 without hindering detection of lost data units.

The acknowledgement may include a bitmask that indicates receipt of data units in a range that begins at data unit "N." For example, acknowledgement 60 would indicate receipt of data units 1, 3, 7, 8 and 10, where N=1. In this case, the acknowledgements are not cumulative because each acknowledgement message specifies which data units within the range have been received. Once data units beyond the range have been received, N is increased to acknowledge the data units that are beyond the original range.

Figure 5:
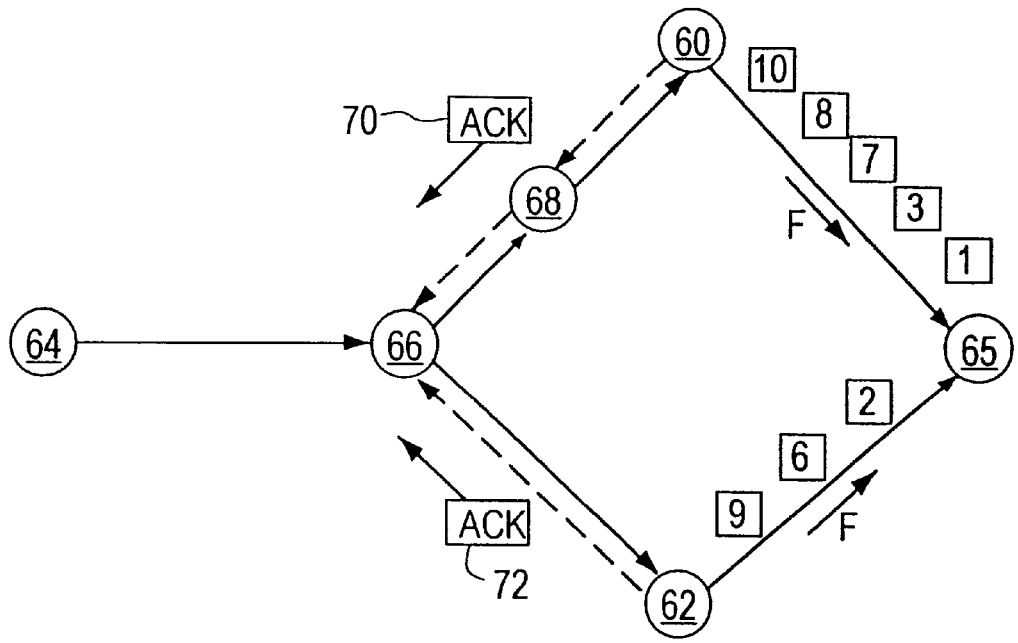
FIG. 5 is a block diagram that illustrates operation of the acknowledgement-based protocol, consistent with the present invention, in a network portion with a device that does not support the protocol.

Referring to FIG. 5, the acknowledgement-based semi-reliable protocol is also tolerant to network devices that do not support the protocol. In the illustrated example, a flow F between a router device 64 and a router device 65 is split following router device 66. A first path from device 66 to device 65 traverses a device 68 and a device 60, and a second path from device 66 to device 65 traverses device 62. If device 68 does not support the adaptive protocol, device 60 transmits a receipt acknowledgement 70 for data units 1, 3, 7, 8 and 10 to device 66 via device 68, and router device 62 transmits a receipt acknowledgement 72 for data units 2, 6, 9 to device 66, then device 66 determines that data units 4 and 5 are indicated to be lost. In particular, network device 68 that does not support the protocol is "skipped." Hence, operation is not substantially hindered by the non-compliant routing device 68.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A method of managing transmission of data units in a flow from a first device to a third device via a second device in a communications network, comprising:

receiving at the second device at least some of a sequence of data units transmitted from the first device;

determining which, if any, of the data units of said sequence are missing data units that have not been received at the second device;

transmitting the at least some data units of said sequence that have been received at the second device toward the third device;

transmitting from the second device to the first device at least one request for retransmission of the missing data units of said sequence;

after transmitting the request for re-transmission of the missing data units, continuing to receive data units of the sequence from the first device and to transmit the received data units toward the third device, such that data units appearing later in the sequence than the missing data units are received and transmitted toward the third device before the re-transmitted missing data units;

tracking the data units of said sequence that were not received at the second device by maintaining a record of predetermined range N to N+M that indicates, starting with data unit N, which data units were not received at the second device; and ceasing further efforts to obtain a lost data unit N once data unit N+M+1 is received at the second device.

2. A method for managing transmission of data units in a flow from a first device to a third device via a second device in a communications network, comprising:

transmitting a sequence of data units from the first device toward the second device;

receiving at least some of the data units of said sequence at the second device;

acknowledging the data units of said sequence that are received at the second device by transmitting a receipt acknowledgement message to said first device, the receipt acknowledge message specifying which data units were received in a range of data units N to N+M;

transmitting the data units of said sequence that have been received at the second device toward the third device in the order received at the second device, without regard to whether the data units have been received in the same order as they appear in the sequence;

at the first device, determining from the identities of the received data units appearing in the receipt acknowledgment message received from the second device whether any of the previously transmitted data units of the sequence are missing data units that have not been received by the second device, and re-transmitting such missing data units to the second device, such that the re-transmitted data units are transmitted to the second device after data units appearing earlier in the sequence have been transmitted to the second device and correctly received thereby; and at the second device, continuing after any such re-transmitting by the first device to receive the data units transmitted by the first device and to transmit the received data units toward the third device, such that data units appearing later in the sequence than the missing data units are received and transmitted toward the third device before the missing data units.

3. The method of claim 2 wherein acknowledging includes acknowledging receipt of a plurality of data units with each acknowledgement message.

* * * * *